No. 747,577. PATENTED DEC. 22, 1903.
D. C. BENJAMIN.
DEVICE FOR PREVENTING ANIMALS FROM BREACHING WIRE FENCES.
APPLICATION FILED JULY 21, 1903.
NO MODEL.
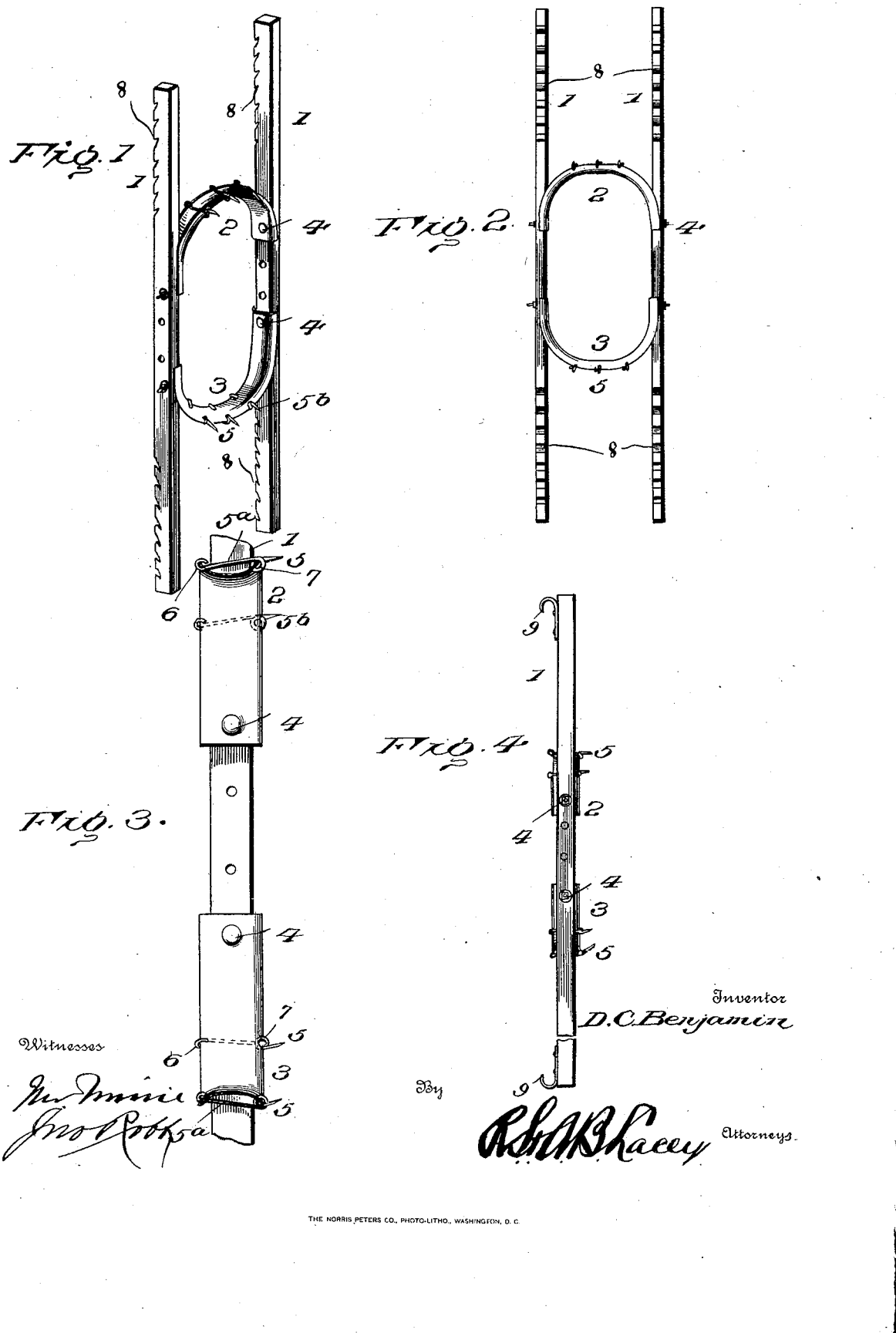

No. 747,577.

Patented December 22, 1903.

UNITED STATES PATENT OFFICE.

DARIUS C. BENJAMIN, OF JACKSON, MINNESOTA.

DEVICE FOR PREVENTING ANIMALS FROM BREACHING WIRE FENCES.

SPECIFICATION forming part of Letters Patent No. 747,577, dated December 22, 1903.

Application filed July 21, 1903. Serial No. 166,464. (No model.)

*To all whom it may concern:*

Be it known that I, DARIUS C. BENJAMIN, a citizen of the United States, residing at Jackson, in the county of Jackson and State of Minnesota, have invented certain new and useful Improvements in Devices for Preventing Animals from Breaching Wire Fences, of which the following is a specification.

The purpose of this invention is to provide a device which may be attached to animals for preventing same from breaking through inclosures, and thus escaping to rove at large to the injury of property and even persons.

The attachment is mostly for use upon cattle, being in the nature of a projecting yoke member provided with spurs or analogous means for causing pain to the animal when the said yoke member comes into contact with the fence.

The need of a plurality of fence-wires is obviated by utilization of the invention, and the "barb-wire" type of fence also may be done away with, same being essentially undesirable for reasons which are known to the average person.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1 is a perspective view of the device. Fig. 2 is a front elevation. Fig. 3 is a central sectional view. Fig. 4 illustrates a modification.

Corresponding and like parts are referred to in the following description and indicated in all the views of the drawings by the same reference characters.

The device consists, essentially, of a plurality of engaging bars 1, which bars are preferably two in number, and a yoke consisting of upper and lower sections 2 and 3, disposed intermediate the spaced engaging bars 1. The yoke-sections 2 and 3 are approximately semicircular in form and are secured at their ends to the inner sides of the spaced bars. These yoke-sections 2 and 3 are preferably constructed of metal and are of arched form in cross-section, as shown most clearly in Fig. 3 of the drawings. The bars 1 may be made of wood or any material which may be found most suitable by the inventor in the production of the article. The fastenings 4, which secure the end portions of the yoke-sections 2 and 3 and the bars 1, may be bolts, as illustrated, or any means of like character. The sections 2 and 3 are provided upon their intermediate outer portions with spurs 5, which project from one edge of the section, and each consisting of a shank $5^a$ and point $5^b$. The end of the shank is provided with a loop 6, which passes through an opening upon the edge of the arched section, and the body of the shank extends across the arched portion of the yoke-sections, being provided with an intermediate loop portion 7, which engages an opening provided upon the opposite edge of the section. The shanks of the spurs 5 are thus almost entirely disposed within the arched portions of the sections 2 and 3, this being of advantage, since the parts are not permitted to project. The spaced bars 1 have undercut notches 8 disposed upon the end portions thereof and extending approximately adjacent the point of the bars, to which the yoke-sections are attached. These notches 8 are located upon the sides of the spaced bars opposite to the sides adjacent the edges of the sections 2 and 3, upon which the spurs 5 are located.

As will be readily apparent, the yoke-sections receive the neck of the animal, and the spurs are disposed with reference to the body of the said animal so that any appreciable pressure against the outer sides of the spaced bars—as, for instance, upon engagement of a wire with the notches 8 thereon—will cause the spurs 5 to be embedded in the flesh of the animal. Of course should the animal persist in its attempt to pass the fence the more pressure is exercised against the notched portions of the spaced bars, the deeper the spurs are embedded, and the greater the pain caused. The above will prevent the passage of the animal through the fence in an obvious manner.

In order that the device may be attached to animals of different sizes, the spaced bars are provided with a plurality of openings to receive the fastenings 4, which secure the sections of the yoke to the said spaced bars. Adjustment of the fastenings in these openings is made, if desired, and permits of almost universal application of the device.

In the modification shown in Fig. 4 the bars 1 are provided upon corresponding end portions with engaging hooks 9, which in some instances are better adapted for causing the positive engagement of the device with any object with which it comes into contact. When the hooks 9 are used, the bars 1 are not provided with the notches 8.

Having thus described the invention, what is claimed as new is—

1. In a device of the character described, comprising engaging bars spaced apart and disposed in approximately parallel relation, yoke-sections disposed between said bars, and means for adjusting the said sections relative to each other.

2. In a device of the character described, comprising spaced engaging bars disposed in approximately parallel relation, yoke-sections of arched form in cross-section disposed intermediate the bars, and spur devices carried by said sections.

3. In a device of the character described, comprising spaced engaging bars disposed in approximately parallel relation, yoke-sections of approximately semicircular form and of arched form in cross-section disposed intermediate the bars, and spur devices disposed upon the said sections.

4. In a device of the character described, comprising spaced bars disposed in approximately parallel relation, yoke-sections of semicircular form and of arched form in cross-section disposed intermediate the bars, and spur devices carried by the aforesaid sections upon the arched sides thereof.

5. In a device of the class described, comprising spaced bars, yoke-sections of semicircular form and of arched form in cross-section disposed intermediate the bars, means for adjustably attaching the said sections, openings disposed upon the arched edges of the yoke-section and spurs consisting of a shank and joint disposed upon the said arched section, the shank of each spur being provided at its end with a loop passed through an opening in one edge of the section having an intermediate loop passed through the opening opposite to that aforementioned.

In testimony whereof I affix my signature in presence of two witnesses.

DARIUS C. BENJAMIN. [L. S.]

Witnesses:
H. L. STROM,
JOS. J. PREBYL.